United States Patent

Kling et al.

Patent Number: 5,730,090
Date of Patent: Mar. 24, 1998

[54] RECIPROCATING PISTON FOR INTERNAL COMBUSTION ENGINES

[75] Inventors: Jurgen Kling, Heimsheim; Klaus Stoll, Hochdorf, both of Germany

[73] Assignee: Mahle GmbH, Stuttgart, Germany

[21] Appl. No.: 647,947

[22] PCT Filed: Nov. 17, 1994

[86] PCT No.: PCT/DE94/01375

§ 371 Date: May 17, 1996

§ 102(e) Date: May 17, 1996

[87] PCT Pub. No.: WO95/15433

PCT Pub. Date: Jun. 8, 1995

[30] Foreign Application Priority Data

Dec. 1, 1993 [DE] Germany .............. 43 40 891.5

[51] Int. Cl.$^6$ ...................................... F01P 1/04
[52] U.S. Cl. ........................... 123/41.35; 92/186
[58] Field of Search ..................... 123/41.35; 92/186

[56] References Cited

U.S. PATENT DOCUMENTS

| 3,189,010 | 6/1965 | Isley | 123/41.35 |
| 5,081,959 | 1/1992 | Akiyama | 123/41.35 |

FOREIGN PATENT DOCUMENTS

| 359932 | 3/1990 | European Pat. Off. |
| 2458685 | 1/1981 | France |
| 1191176 | 4/1965 | Germany |
| 3732927 | 9/1989 | Germany |
| 4005312 | 8/1990 | Germany |
| 3543084 | 9/1990 | Germany |
| 973900 | 11/1982 | Russian Federation |
| 1117610 | 6/1968 | United Kingdom |
| 80/02308 | 10/1980 | WIPO |

*Primary Examiner*—Noah P. Kamen
*Attorney, Agent, or Firm*—Collard & Roe, P.C.

[57] ABSTRACT

An internal combustion engine with at least one cooling oil injector arranged in the motor housing, and at least one reciprocating piston made of light metal. The piston head has a combustion space depression and a closed, ring-shaped cooling oil channel arranged thereon. The channel has an inlet opening and at least one outlet opening. A cooling oil injector rigidly joined with the engine housing injects a free jet of oil aligned slanted relative to the axis of the piston. The ring-shaped cooling oil channel is partly filled with cooling oil in the motor operation. The inlet opening has an edge stretched out long in the circumferential direction of the piston, which ends funnel-like in the zone of the inside wall of the piston skirt. The piston can accommodate high stresses since the length of the inlet opening disposed in the circumferential direction of the ring-shaped cooling oil channel is slightly shorter than the length required to directly collect the oil jet in all piston positions.

2 Claims, 2 Drawing Sheets

5,730,090

RECIPROCATING PISTON FOR INTERNAL COMBUSTION ENGINES

BACKGROUND OF THE INVENTION

1. Field of the Invention

The invention relates to an internal combustion engine with at least one cooling oil injector arranged in the motor housing and at least one reciprocating piston made of light metal.

2. The Prior Art

Such an arrangement is known from Soviet Union Patent No. SU-97300. In the piston described therein, both the inlet opening and the outlet opening are stretched in the circumferential direction of the ring-shaped channel. In order to be as long as possible, the stretched openings have to encompass the entire area disposed between the adjacent hubs of the piston. The long-stretched shape of the inlet opening permits the jet of cooling oil to be injected to impact various zones of the piston head during the reciprocating movement of the piston. For this purpose, a cooling air injector injects the cooling oil from the crank space at an angle against the piston head. Due to the reciprocating movement of the piston, the slanted infeed of the cooling oil causes the point of impact to migrate across the entire longitudinal expanse of the inlet opening during the reciprocating movement of the piston. For reasons of symmetry, the outlet opening discharging the cooling oil from the ring-shaped cooling oil channel has the same shape as the inlet opening.

Such prior art pistons suffer from several drawbacks. Because of the large inlet and outlet openings extending on the pressure side and counter-pressure side of the piston across the entire range disposed between the hubs, the prior art piston is not sufficiently strong, especially when the piston is highly stressed. Furthermore, the prior art pistons do not permit adequate cooling of the cooling oil circulating in the cooling channel. To obtain sufficient cooling, the ring-shaped cooling oil channel must be always partially filled. However, a relatively small discharge opening is required to achieve partial filling of the ring-shaped channel space.

DE-AS 1 191 176 shows a piston in which the cooling oil channels are formed by bores extending wind-tilted to the piston axis. There are always two bores connected to each other in the zenith. The bores do not form a cooling oil channel according to the invention. Due to the bores, the shaft and the piston head are weakened. A sharp ridge is formed at the area where the bores run obliquely into each other. The performance of these cooling oil channels, due to the height differences in their course, also differs from the subject matter of the invention. The prior art does not achieve continuous partial filling during operation of the motor, or a shaker effect resulting therefrom, with a respective good heat flow. In addition, the prior art patent restricts the possibility of an optimal position of the cooling channels relative to the surfaces to be cooled, since the bores can only create straight cooling channels.

SUMMARY OF THE INVENTION

The invention deals with the problem of changing the inlet and outlet openings of the reciprocating piston's ring-shaped cooling oil channel so as to achieve an optimal cooling effect from the cooling oil circulating in the ring-shaped channel, while also assuring adequate strength of the piston under high stresses.

The present invention makes it possible to inject a major portion of a jet of cooling oil at an angle into the ring-shaped cooling oil channel. The funnel-like design of the inlet opening leading into the ring-shaped cooling oil channel enables this operation.

With engines whose pistons do not have a closed ring-shaped cooling oil channel, and where the jet of cooling oil is directly aimed at the zenith zone of the interior of the piston skirt, cooling oil jets positioned directly at an angle are used. Due to the angled alignment of the cooling oil jet, the jet impacts different points of the zenith zone due to the reciprocating motion of the piston. In pistons without a closed ring-shaped cooling oil channel, this effect is obtained by having the two opposite hubs of the piston skirt directly impacted at different positions of reciprocation of the piston by cooling oil injected in a slanted flow. In some cases, it is desirable to use pistons with and pistons without ring-shaped cooling oil channels for engines with different outputs in an identical engine housing, i.e., with the same arrangement of the cooling oil injector. Such exchangeability is readily possible with pistons having a cooling oil inlet opening designed according to the invention. This is an important economical advantage.

For strength reasons, the length of the inlet opening in the direction of the ring-shaped channel should be as short as possible. Accordingly, it is necessary to find a balance between strength and the desired large size of the inlet opening.

For strength reasons and so as to ensure that the ring-shaped cooling oil channel is partially filled with cooling oil when the engine is in operation, the cross section of the outlet opening should maximally measure about one-third of the cross-sectional area of the inlet opening.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

An exemplified embodiment of the invention is shown in the drawings, in which.

DETAILED DESCRIPTION OF THE PREFERRED EMBODIMENT

Figure 1:
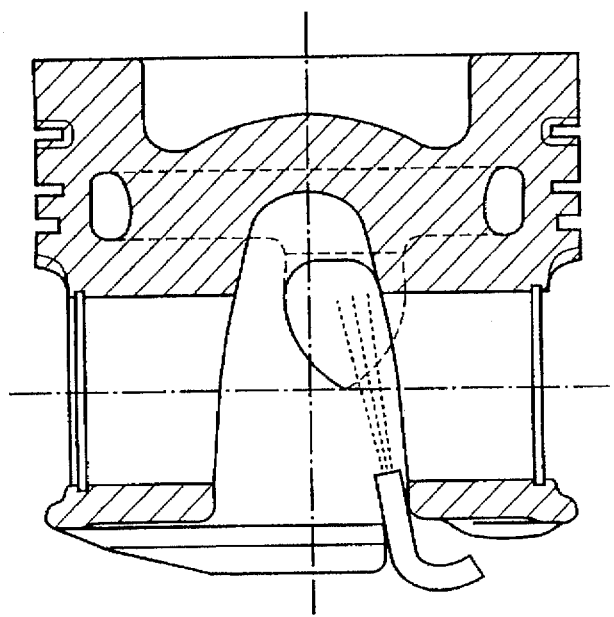
FIG. 1 shows a longitudinal section through a piston.
Figure 2:
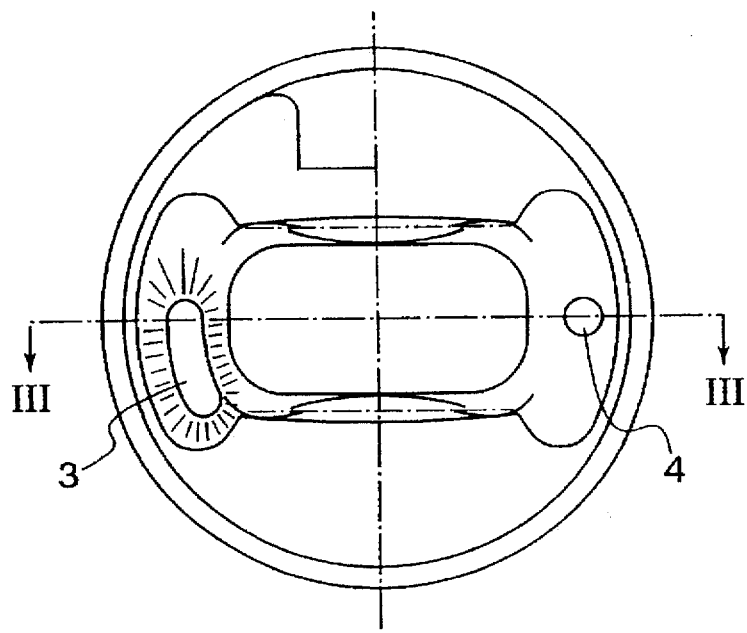
FIG. 2 shows a bottom view of the piston.
Figure 3:
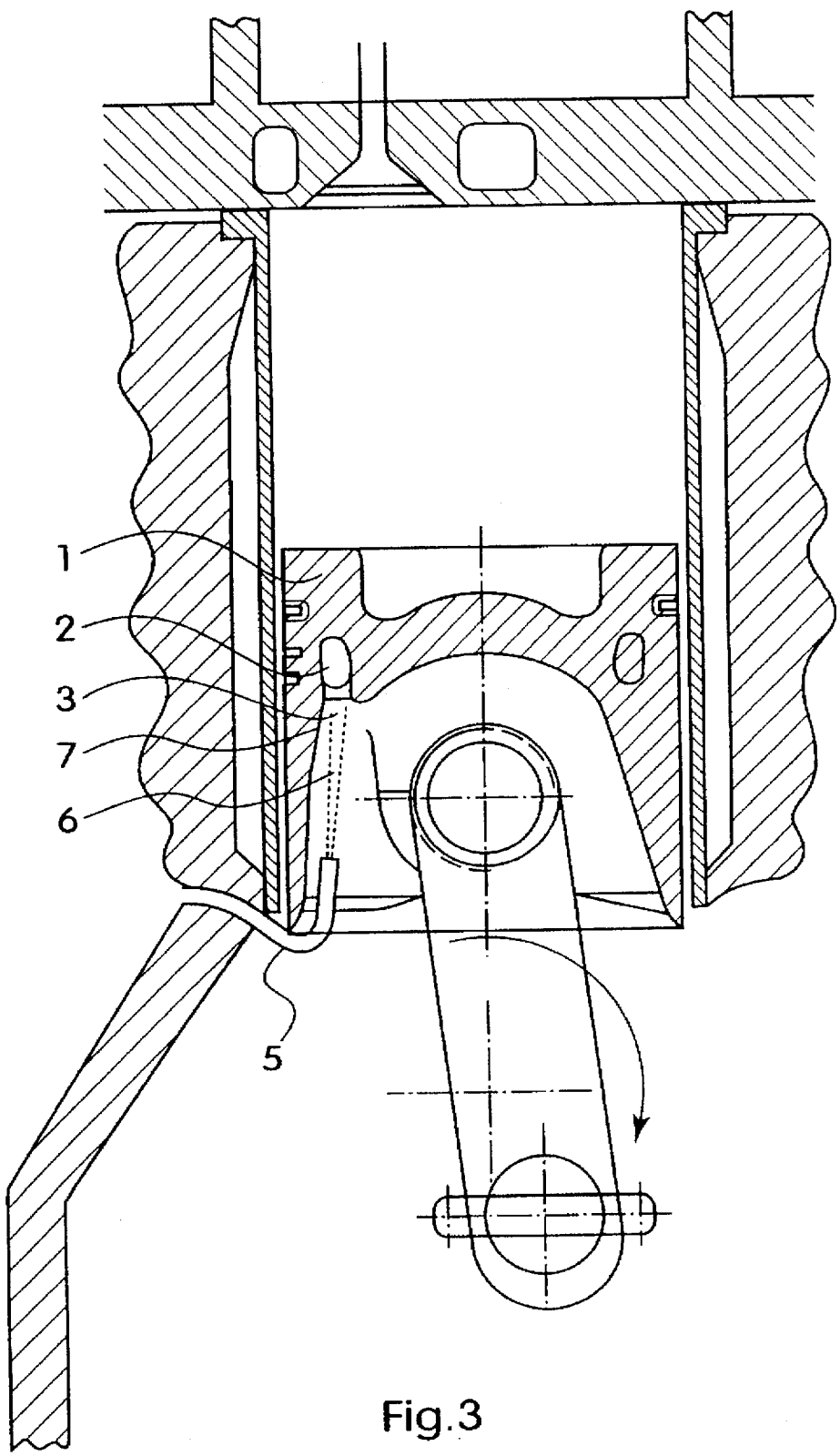
FIG. 3 shows a part section through a piston as it is arranged in the engine and according to line III—III in FIG. 2.

FIGS. 1–3 show light-metal piston 1 having a closed ring-shaped cooling oil channel 2 in its piston head zone. Channel 2 has an inlet opening 3 and an outlet opening 4.

An oil injector 5 is rigidly arranged on the engine housing in the top zone, for introducing oil into inlet opening 3. Cooling oil jet 6 exits from cooling oil injector 5 and is aligned with inlet opening 3.

The cross section of inlet opening 3 extends funnel-shaped into the interior contour of the piston skirt. Funnel zone 7 is steplessly fed into the radial interior of the skirt. Overall, the inside contour of the piston is curved in a radial plane extending through the opening range of inlet opening 3. This results in a funnel zone 7 which extends all around, and in which the jet of cooling oil can be collected very effectively. Due to the stepless transition of funnel zone 7 into the radial interior zone of the skirt, cooling oil sprayed against the inside surface of the skirt can be effectively transmitted by funnel zone 7 into inlet opening 3.

Cooling oil injector 5 is aligned so that cooling oil jet 6 extends at an angle relative to the axis of the piston. The slanted course provides for cooling a piston without a closed ring-shaped cooling oil channel. With such an alignment of the cooling oil injector, the nearly-complete collection of the jet of cooling oil within funnel zone 7 is easily achieved in any position of the piston. The ring-shaped cooling oil channel has a uniform filling volume at any position of reciprocation with a predetermined degree of filling. This advantageous arrangement is due to smaller outlet opening 4.

We claim:

1. Internal combustion engine with at least one cooling oil injector arranged in the motor housing and at least one reciprocating piston with a combustion space depression in the piston head and a closed, ring-shaped cooling oil channel arranged thereon, said channel having an inlet opening and at least one outlet opening, wherein the cooling oil is injected with a free jet of oil directed at an angle relative to the axis of the piston by a cooling oil injector rigidly joined with the engine housing, from the crank space through the free interior space of the piston skirt and into the inlet opening of the ring-shaped cooling oil channel, the ring-shaped cooling oil channel being partly filled with cooling oil in the motor operation and the inlet opening having an edge stretched out in the circumferential direction of the piston, said opening ending funnel-like in the zone of the inside wall of the piston skirt, characterized by the following features assuring high stressability of the piston:

(a) The length of the inlet opening disposed in the circumferential direction of the ring-shaped cooling oil channel is slightly shorter than the length which would be required for directly collecting the oil jet in all positions of reciprocation of the piston;

(b) the inlet opening directly borders on one of two opposite hubs of the piston, said hubs receiving a piston pin;

(c) the total length of the inlet opening maximally amounts to two-thirds of the circumferential spacing between the hubs of the piston; and (d) the outlet opening is round and has a diameter approximately conforming to the radial width of the ring-shaped cooling oil channel.

2. Reciprocating piston according to claim 1, characterized in that the cross section of flow of the inlet opening (3) measures at least three times the cross section of the outlet opening (3).

* * * * *